United States Patent
Juelich et al.

(10) Patent No.: US 12,443,604 B2
(45) Date of Patent: Oct. 14, 2025

(54) NESTED DISCOVERY AND DELETION OF RESOURCES

(71) Applicant: PALANTIR TECHNOLOGIES INC., Denver, CO (US)

(72) Inventors: Jakob Juelich, London (GB); James Baker, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/809,178

(22) Filed: Aug. 19, 2024

(65) Prior Publication Data

US 2024/0411765 A1   Dec. 12, 2024

Related U.S. Application Data

(63) Continuation of application No. 17/949,965, filed on Sep. 21, 2022, now Pat. No. 12,067,020, which is a continuation of application No. 16/870,335, filed on May 8, 2020, now Pat. No. 11,481,399.

(60) Provisional application No. 62/926,363, filed on Oct. 25, 2019.

(51) Int. Cl.

| | |
|---|---|
| G06F 16/2455 | (2019.01) |
| G06F 16/16 | (2019.01) |
| G06F 16/901 | (2019.01) |
| G06F 16/953 | (2019.01) |
| G06F 21/62 | (2013.01) |

(52) U.S. Cl.
CPC ...... *G06F 16/24566* (2019.01); *G06F 16/162* (2019.01); *G06F 16/9024* (2019.01); *G06F 16/953* (2019.01); *G06F 21/6227* (2013.01)

(58) Field of Classification Search
CPC ............ G06F 16/24566; G06F 16/162; G06F 16/9024; G06F 16/953; G06F 16/90335; G06F 21/6227; G06F 2221/2143
See application file for complete search history.

(56) References Cited

U.S. PATENT DOCUMENTS

| | | |
|---|---|---|
| 6,247,024 B1 | 6/2001 | Kincaid |
| 2005/0033777 A1 | 2/2005 | Moraes et al. |
| 2009/0300069 A1 | 12/2009 | O'Sullivan |
| 2012/0233134 A1 | 9/2012 | Barton et al. |
| 2014/0304235 A1 | 10/2014 | Rooks et al. |
| 2014/0330873 A1 | 11/2014 | Cha et al. |

(Continued)

OTHER PUBLICATIONS

Non-Final Office Action dated Dec. 22, 2023, issued in related U.S. Appl. No. 17/949,965 (13 pages).

(Continued)

*Primary Examiner* — William Spieler
(74) *Attorney, Agent, or Firm* — Sheppard Mullin Richter & Hampton LLP

(57) ABSTRACT

Systems, methods, and non-transitory computer readable media are provided for recursively searching a plurality of workspaces of the system for linked data associated with the seed data, initiating an endpoint process for each the seed data and the linked data, and, upon completion of the search, delete the seed data and the linked data identified based at least in part on the endpoint process. The process may be automatically repeated at a predetermined time interval to identify and remove future data that is stored in the plurality of datasets.

20 Claims, 5 Drawing Sheets

(56) References Cited

U.S. PATENT DOCUMENTS

| | | | |
|---|---|---|---|
| 2015/0074155 A1* | 3/2015 | Walter | G06F 12/0269 707/816 |
| 2015/0100546 A1 | 4/2015 | Eberlein et al. | |
| 2016/0253362 A1 | 9/2016 | Zhuang et al. | |
| 2019/0108246 A1 | 4/2019 | Jois et al. | |

OTHER PUBLICATIONS

Non-Final Office Action dated Mar. 10, 2022, issued in related U.S. Appl. No. 16/870,335 (14 pages).

* cited by examiner

NESTED DISCOVERY AND DELETION OF RESOURCES

CROSS REFERENCE TO RELATED APPLICATIONS

This application is a continuation of U.S. patent application Ser. No. 17/949,965, filed Sep. 21, 2022, which is a continuation of U.S. patent application Ser. No. 16/870,335, filed May 8, 2020, which claims the benefit under 35 U.S.C. § 119 (e) of U.S. Provisional Application Ser. No. 62/926,363 filed Oct. 25, 2019. The entire contents of all of the above referenced applications are incorporated herein by reference.

FIELD OF THE INVENTION

This disclosure relates to approaches for providing nested discovery and deletion of resources in a distributed system architecture.

BACKGROUND

Data management systems can store and manage data and data relationships. Some of this data should no longer be used for various reasons, including when data are older than a threshold date, when new data are added that would replace old data, when only the most recent number of versions would be required for retention, or when an entire dataset must be deleted (e.g., client request, privacy concerns, etc.). When data comprise various electronic resources, including a digital folder, comments, reports or other analysis, or files stored within the system, the possibility of data that references other data becomes massive.

SUMMARY

The storage and management of the data and data relationships may require deletion of the data. One solution is to access a dataset that stores the data in the data management system and merely delete the data within it. However, some data management systems comprise millions of data references across datasets, including related data, derived objects from original data, reports referencing the data, and data dependencies. When data are deleted, the derived or referenced data must be deleted as well. As such, if something is merely deleted from a dataset, some of these data references may remain. Additionally, data streams may continuously provide data that is stored with the system. The goal is to fully delete the data, which is very difficult in a large data management system.

Various embodiments of the present disclosure may include systems, methods, and non-transitory computer readable media configured to provide nested discovery and deletion of resources in a distributed system architecture. Resource data can be identified, recursively traversed, and deleted through a methodical process that includes adding an endpoint to help identify all seed data and its linked data for deletion.

In some embodiments, search criteria may be received by a system. The search criteria may be associated with data that is stored and may be deleted in the system. The data may be stored in a plurality of datasets at a plurality of workspaces of the system. The search criteria may be applied to the data so that the application of the search criteria identifies seed data in the plurality of datasets. The system may recursively search the plurality of workspaces of the system for linked data associated with the seed data. An endpoint process may be initiated for each the seed data and the linked data. In some examples, the endpoint process may flag the seed data and the linked data for deletion. Upon completion of the search, the seed data and the linked data may be deleted based at least in part on the endpoint process. In some examples, the recursive search may be automatically repeated at a predetermined time interval to identify and remove future data that are stored in the plurality of datasets. The future data may correspond with the search criteria associated with the data.

In some embodiments, the search criteria may comprise a threshold date, identification of new data, or version identifier associated with the seed data.

In some embodiments, the linked data may comprise data files derived from the seed data.

In some embodiments, the linked data may comprise data permissions of users permitted to access the seed data.

In some embodiments, the system may further comprise instructions to send one or more notifications of the deletion to one or more administrators.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
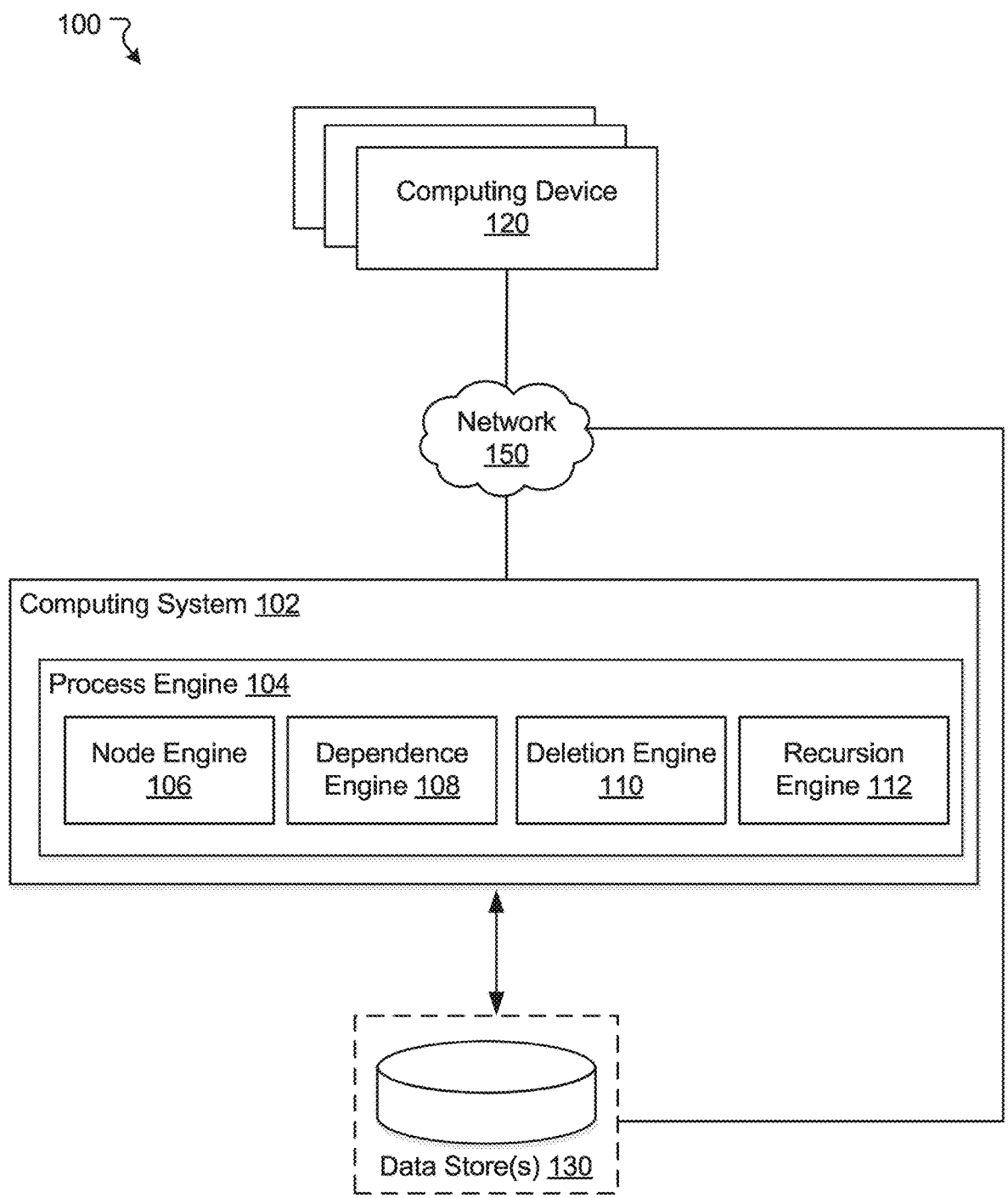
FIG. 1 illustrates an example environment for providing nested discovery and deletion of resources in a distributed system architecture, in accordance with various embodiments.

Under conventional approaches, various types of data can be stored and represented using an object model. The object graph created based on the object model may include a number of objects that serve as containers for data. Each object can include a number of object components. The data represented by such objects may itself reside on various data sources (e.g., federated data sources, conventional databases, etc.). In some instances, conventional approaches for managing objects and data represented by those objects may be inadequate. For example, conventional approaches may not be sufficient to implement data retention policies that manage the retention of both objects and data represented by those objects.

A claimed solution rooted in computer technology overcomes problems specifically arising in the realm of computer technology. In various embodiments, data are identified, recursively traversed, and deleted through a methodical process that includes adding an endpoint to help identify all seed data and its linked data for deletion.

To identify the seed data, the claimed solution may generate a filter to find the seed data in a dataset that matches particular criteria. The criteria may include basic filtering rules, including identifying data by a term or threshold date, version identifier, or any data that may be stored in association with the particular data store location. The identification of the seed data may correspond with a filtering mechanism that identifies data that corresponds with a particular search function associated with the identified criteria.

Linked data may also be identified. For example, the claimed solution may implement the filter to identify the linked data corresponding with the seed data. In a sample illustration, seed data may be stored with a first dataset and permissions of users that can access the seed data may be stored in a separate dataset. In another example, a first service with multiple datasets may comprise the first dataset and a second service with multiple different datasets may comprise the second dataset. Each of these data locations of seed data and linked data may be identified through the traversal process.

Additionally, the data management system may comprise a micro-services architecture without a central repository where resources are stored. For example, different services may be tasked with managing different types of data. The different types of data can be represented based on an ontology and subsequently linked based on their relationships to one another. The search for linked data may comprise querying hundreds of services in a recursive process. In some embodiments, an API may be implemented that can receive an object identifier of the seed data and request services tasked with managing various datasets to search for a matching datatype of the object identifier (e.g., using subscribing logic). In the search process, the system may initiate the search at a seed node and traverse through the edges of the object graph. When additional data are found, the object identifiers and/or the object type associated with each node may be updated to identify the future deletion status.

The data identified through the traversal process may be marked or flagged for deletion through the use of an endpoint. The endpoint can correlate the data with an identification (e.g., tag, flag, identifier, etc.) to delete it at a later time. For example, when a list of data entries or data tags identifies the data object for deletion by associating an endpoint for each data object, the system can query the list to identify further dependencies from this data without altering the deletion process for the data.

The traversal may be ended when there are no more nodes in an object graph. For example, the system may continue searching through browse nodes until an object node is identified as anonymized data or comprises a restriction on access of the corresponding data.

Upon completion of the traversal, the system may delete all seed data and linked data that were identified through the traversal process (e.g., marked or flagged for deletion). The deletion process may generate an error log that may document any failure encountered when attempting to delete the seed data or linked data.

At some time frame, for example at the end of the day, the system can send notifications of imminent or upcoming object deletions to a designated administrator. In some examples, the notification may include a confirmation that all deletion tasks are completed and that all data has been successfully purged from the system.

In some instances, new data may be added to the system that is related to the first dataset. For example, the new data may include a report (e.g., linked data) that relies on aggregated data (e.g., linked data or seed data) that was deleted. The identification process may be repeated constantly at predetermined intervals. In some examples, the predetermined intervals may include one hour, five hours, 125 hours (e.g., multipliers and iterations of five, etc.) to check for any caching systems or constant streams of data that are received from external sources. The constant scanning of the system may help identify receiving data that should have been deleted. In some examples, the system may stop initiating the identification process when no data are returned that match the search criteria.

The approaches disclosed herein enable a recursive discovery and deletion of resources in a distributed, data management system architecture. Rather than merely accessing a single dataset in the system, the recursive process may identify related data, derived data objects from original data, reports referencing the data, analyses of the data, and other data dependencies. Additionally, data streams that continuously provide data may be identified and the data corresponding with the continuous data stream may be deleted at a predetermined interval of time. The automatic monitoring of future data may help improve data compliance according to various data privacy restrictions and efficiently maintain data structures for improved system maintenance. Further, deletion of data may reclaim disk space, help ensure individual files are timely removed from the distributed system, and help further limit derived data or referenced data to further increase data security.

FIG. 1 illustrates an example environment 100 for providing nested discovery and deletion of resources in a distributed system architecture, in accordance with various embodiments. Example environment 100 may include computing system 102. Computing system 102 may include one or more processors and memory. The processor(s) may be configured to perform various operations by interpreting machine-readable instructions stored in the memory. Environment 100 may also include one or more datastores that are accessible to computing system 102 (e.g., via one or more network(s)). In some embodiments, the datastore(s) may include various databases, application functionalities, application/data packages, and/or other data that are available for download, installation, and/or execution.

In some embodiments, computing system 102 may comprise a micro-services architecture without a central repository where resources are stored. For example, different services may be tasked with managing different types of data. The different types of data can be represented based on an ontology, including nodes in an object graph, and subsequently linked based on their relationships to one another. Additional details describing the micro-services architecture and/or object graph will be provided in reference to FIGS. 2-3.

In some embodiments, computing system 102 may store and manage various data as objects in one or more object graphs. In some embodiments, an object graph may be made up of a number of objects that serve as containers for data. The object graph can also identify various relationships between objects, for example, using edges (or links) that connect objects. Each object can include a number of object components including, for example, a properties component that includes structured pieces of information, a media component that includes binary attachments of data (e.g., text documents, images, videos, etc.), a notes component (e.g., a free text container), and one or more respective links (or edges) that associate the object with other objects in the object graph. In some instances, the object graph can include different types of objects. For example, an object may represent an entity (e.g., person(s), place(s), thing(s), etc.), an activity (e.g., event, incident, etc.), a document, or multimedia, to name some examples. In some embodiments, objects can be associated with properties (or states) that can be used to manage retention of those objects in the object graph and/or data represented by those objects in one or more data sources. These data sources may include federated data stores, databases, or any other type of data source from which data can be ingested and represented as objects, for example. In some embodiments, data corresponding to populated object graphs is stored and accessible through one or more data stores 130.

In some embodiments, computing system 102 may include process engine 104. Process engine 104 may include node engine 106, dependence engine 108, deletion engine 110, and recursion engine 112. Process engine 104 may be executed by the processor(s) of computing system 102 to perform various operations including those operations described in reference to node engine 106, dependence engine 108, deletion engine 110, and recursion engine 112. In general, process engine 104 may be implemented, in whole or in part, as software that is capable of running on one or more computing devices or systems. In one example, process engine 104 may be implemented as or within a software application running on one or more computing devices (e.g., user or client devices) and/or one or more servers (e.g., network servers or cloud servers). In some instances, various aspects of node engine 106, dependence engine 108, deletion engine 110, and recursion engine 112 may be implemented in one or more computing systems and/or devices.

Environment 100 may also include one or more data stores 130 accessible to computing system 102. Data stores 130 may be accessible to computing system 102 either directly or over network 150. In some embodiments, data stores 130 may store data that may be accessed by the process engine 104 to provide the various features described herein. In some instances, the data stores 130 may include federated data stores, databases, or any other type of data source from which data may be stored and retrieved, for example. In some implementations, data stores 130 may include various types of datasets on which determinations of accuracy or consistency with other information can be made. In general, a user operating computing device 120 can interact with computing system 102 over network 150, for example, through one or more graphical user interfaces and/or application programming interfaces.

Node engine 106 may be configured to identify one or more basic units of a data structure associated with computing system 102. For example, a set of objects (e.g., nodes) may represent data stored on one or more data sources. Data may comprise an identifier, description, and any other data described in reference to the object graph.

Node engine 106 may identify one or more data sources. A data source may correspond to, for example, a text file (e.g., a CSV file) that includes rows of values separated by commas. In this example, an object may be created to represent a row of values and properties of the object can each correspond to a comma separated value in the row. The identification of an endpoint or other data retention configurations may also be applied to data that is represented by these objects. Such data may be stored and accessed through data sources. For example, each object can be associated with various components (e.g., properties) as defined by an object-based data model. An object can, therefore, represent data that remains stored and accessible through a given data source.

Node engine 106 may identify one or more data nodes that correspond with an object represented by a single node in an object graph. Attributes of data nodes may include a node identifier, description of data corresponding with the data node object, and links to other nodes, implemented by pointers. Data nodes may be related to other data nodes in the object graph. For example, a first data node (e.g., parent node) may reference one or more second data nodes (e.g., children nodes) or vice versa. The linked relationships between these data nodes may be identified in the attributes of each node.

Data nodes may comprise any data stored with computing system 102. In some examples, a data object can inherit data properties and methods from other nodes including a parent node and child node. One or more data nodes may be stored in a plurality of datasets at a plurality of workspaces of computing system 102, including in data stores 130.

When a new node is added to computing system 102, a data index may be updated to include an object identifier associated with the new data node. Node engine 106 may write the object identifier to the data index. Linked relationships between these data nodes may also be updated with the data index, including object identifiers that identify links to parent nodes and children nodes of the new node and with existing data objects. The data index may be stored with data stores 130.

Node engine 106 may be configured to receive search criteria associated with data. In some examples, the search criteria may correspond with one or more attributes of the data nodes in the object graph structure. Node engine 106 may apply the search criteria through a search or filtering feature of the datasets. The one or more data nodes that match the search criteria may be identified as seed data in the plurality of datasets. In some examples, the seed data may be associated with one or more attributes that match the search criteria. The search criteria may include basic filtering rules, including identifying data by a term or threshold date, version identifier, or any data that may be stored in association with the particular data store location, such that the node objects that match the search criteria would include the threshold date, identification of new data, or version identifier included with the search criteria.

The search criteria may correspond with one or more policies of computing system 102. The policy may correspond with electronic-based rules that determine a duration of time allowed to store data with computing system 102. The policy may be used to generate the search criteria. For example, the policy may correspond with an age-based retention of the data, a version identifier of the data, or any other filtering identifiers received by node engine 106.

Node engine 106 may be configured to apply the search criteria to the data to identify the seed data. Data may be identified by comparing metadata or other data tags associated with data stored in data stores 130 with the search criteria. Upon matching the search criteria with the metadata or other data tags associated with the data, a data identifier may be identified. The data corresponding with the match can be identified as corresponding with the search criteria and or data policy.

In some embodiments, node engine 106 may be configured to query a plurality of services in a recursive process through the micro services architecture of computer system 102. In some embodiments, an application programming interface (API) may be implemented that can receive the search criteria and request services tasked with managing various datasets to search for matching data types of the search criteria (e.g., using subscribing logic).

In some examples, subscribing logic is used. For example, one or more microservices implement an interface that correspond with an endpoint. A traversal service calls the endpoint associated with the interface and records the response to the calls. As an illustrative example, the call may comprise a request for a binary response from the endpoint (e.g., requesting a confirmation if a resource is of a particular type). In some examples, the response may implement a set of filters that determine which kind of resources the microservice can subscribe to as part of the subscribing logic.

Dependence engine 108 may be configured to recursively search the plurality of workspaces of computing system 102 associated with the seed data to determine one or more linked object nodes. For example, dependence engine 108 may query the data index to identify any object identifiers that identify a linked relationship between the object identifier of the seed node and one or more child or parent nodes (e.g., the linked data).

In some embodiments, objects can be identified based on their relationships to other objects. For example, relationships between objects in the object graph can be represented using corresponding edges (or links). In some instances, these object relationships can be used to identify additional related objects on which actions can be performed. For example, a set of objects may relate to a project (or case). In this example, dependence engine 108 can be instructed to perform some action on all objects that relate to the project. Here, dependence engine 108 can use existing object relationships to identify such objects. In some embodiments, edge distance can be used to identify related objects that may otherwise not be identified using some specified criteria. For example, the criteria may specify that objects corresponding to a first case be scheduled for deletion (or some other action). The criteria may also specify that any other objects linked to objects corresponding to the first case with an edge distance of two also be deleted, such that a first object corresponding to the first case may be linked to a second object that corresponds to a second case. Further, the second object may be linked to a third object corresponding to a third case. In this example, the first object, the second object, and the third object can all be scheduled for deletion in view of the specified criteria.

In some embodiments, the recursive search implemented by dependence engine 108 may be configured to traverse through edges of the object graph. The recursive search may begin at the seed node of the object graph and traverse through the edges associated with the seed node of the object graph.

Dependence engine 108 may be configured to apply second search criteria to the data. For example, a first plurality of object identifiers associated with seed data may be determined. The second search criteria may identify permissions of users that can access the seed data. The data determined to be matching the second search criteria may be identified as the linked data. In another example, the first plurality of object identifiers associated with the seed data may be determined and the seed data may correspond with a first service of computing system 102. A second plurality of object nodes may be identified that correspond with the a second service of computing system 102. The plurality of services may correspond with a plurality of datasets stored with data stores 130. Each of these data locations of seed data and linked data may be identified by dependence engine 108 of computing system 102.

Dependence engine 108 may be configured to initiate an endpoint process for each the seed data and the linked data. The endpoint process may flag the seed data and the linked data for deletion. The endpoint process, for example, may associate each data node (e.g., seed data, linked data, etc.) with an endpoint (e.g., an entry point to a service, a process, or destination in a service oriented architecture of computing system 102). Each of these identified endpoints may be accessed by deletion engine 110 for deletion at a future point of time.

In some embodiments, dependence engine 108 may be configured to add object identifiers and/or object types associated with each data node to a data index to identify a future deletion status. For example, the data index may comprise any object identifier associated with data that matches search criteria or is dependent on data that matches the search criteria. In some embodiments, dependence engine 108 may identify the seed node associated with the object identifier in the index stored in data stores 130, including any seed nodes that match search criteria. Dependence engine 108 may also be configured to determine any child nodes associated with seed node (e.g., as linked data).

Deletion engine 110 may be configured to query the data index identifying seed data and linked data that has been determined to match the search criteria. The system can query the data index to identified dependencies from the data without preventing the data from being deleted. In other embodiments, deletion engine 110 may be configured to identify all of the endpoints associated with seed data or linked data.

Deletion engine 110 may be configured to determine whether any child nodes of seed node includes other parent nodes. For example, seed node may be located between a parent node and a child node in a representation of the object graph. Deletion engine 110 may be configured to determine whether the child node is linked to other object nodes other than the seed node, including a second parent node. When a second parent node exists that is not identified for deletion, the child node may be preserved and not deleted. When a second parent node exists that is identified for deletion, the child node may be deleted with the second parent node and the seed node.

Upon completion of the search for seed data and linked data, deletion engine 110 may be configured to delete the seed data and the linked data identified. For example, deletion engine 110 may delete the seed data and the linked data identified as each corresponding with an endpoint determined through the endpoint process. In another example, deletion engine 110 may delete seed data and linked data associated with object identifiers in a data index.

At some time frame, for example at the end of the day, deletion engine 110 may generate and transmit one or more notifications of imminent or upcoming object deletions to a designated administrator. In some examples, the notification may include a confirmation that all deletion tasks are completed and that all data has been successfully purged from the system.

In some embodiments, one or more notifications may be sent to the appropriate users (or administrators) before deleting the data. Such notifications may be sent using conventional approaches for electronically communicating information. In some embodiments, a pre-approval for deletion may be required from authorized users (or administrators) before any actions are performed. In such embodiments, deletion engine 110 can request such approval by the authorized users (or administrators) before performing those actions.

Recursion engine 112 may be configured to automatically repeat the recursive search at a predetermined time interval. In some examples, the predetermined intervals may include one hour, five hours, 125 hours (e.g., multipliers and iterations of five, etc.) to check for any caching systems or constant streams of data that are received from external sources. The constant scanning of the system may help identify receiving data that should have been deleted and/or identify and remove future data that are stored in the plurality of datasets of computing system 102. In some examples, the system may stop initiating the identification process when no data are returned that match the search criteria.

Recursion engine 112 may also be configured to recursively search for items during and after the traversal process. For example, the traversal process may not be atomic so that users can perform operations on the system between the point in time of the traversal and the point in time of the deletion. As an illustrative example, resource A may be selected for deletion, then a user creates resource B that depends on resource A. When resource A gets deleted, resource B should have also been deleted, because it may contain data of resource A. To ensure resource B will be selected for deletion, recursion engine 112 may first discover resources downstream of a seed node (e.g., resource A) and delete it. Recursion engine 112 may restart the discovery from all nodes that have been deleted to determine whether new resources have been added in the meantime and delete those as well. Recursion engine 112 can repeat this process until no new resources are found. However, even if resource A is deleted, it is possible that some microservice still holds cached data about resource A; it is still possible to create a resource B that depends on resource A. Thus, even after no resources are found, recursion engine 112 may repeat this process further, but in exponentially growing intervals. Repeating the discovery process again and again can be used to find the resource B instances to be deleted as well.

In some embodiments, the future data may correspond with the search criteria, including a threshold date, identification of new data corresponding with the search criteria, or version identifier associated with the seed data. In some embodiments, the future data may correspond with new linked data associated with previously deleted seed data. The previously deleted seed data may be identified as corresponding with an endpoint and/or data index that may not have been deleted by deletion engine 110, yet may not include the actual data to be deleted.

Figure 2:
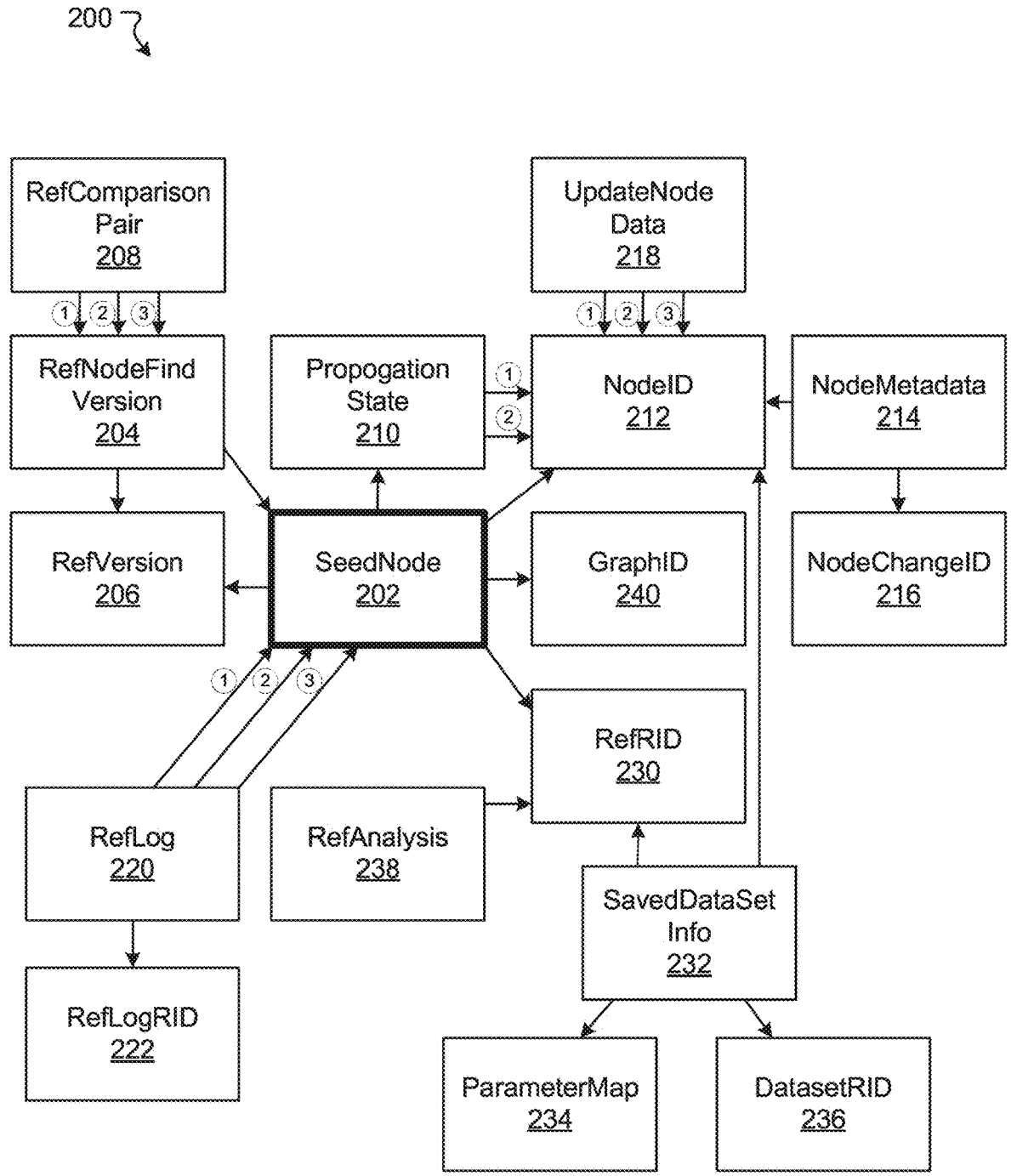
FIG. 2 illustrates an example node resource structure, in accordance with various embodiments.

FIG. 2 illustrates an example node resource structure, in accordance with various embodiments. In illustration 200, a plurality of nodes is provided, including a seed node 202 and a plurality of linked nodes associated with seed node 202. Each of the plurality of nodes may be associated with data, where the data are stored in a plurality of datasets in a plurality of workspaces of the system. The plurality of nodes, including seed node 202 and the plurality of linked nodes, may be recursively searched and associated with an endpoint to flag the data corresponding with these nodes for deletion.

The plurality of nodes may be discoverable through a variety of processes as described above. For example, seed node 202 may be discoverable by matching search criteria (e.g., a text string, etc.) to the data associated with seed node 202. In some examples, this may include querying data to determine a description of seed node 202 and matching at least part of the description to the search criteria.

The linked nodes may be discoverable by analyzing relationship data associated with seed node 202. For example, seed node 202 may correspond with a direct link to a plurality of nodes 204, 206, 210, 212, 220, 230, and 240. Some of the nodes may comprise a plurality of links, including the relationships between linked node 220 and seed node 202. Each of these linked nodes may correspond with linked data of the seed data.

Seed node 202 may correspond with one or more parent nodes or one or more children nodes. For example, seed node 202 may correspond with parent nodes 206, 210, 212, and 230. In some embodiments, seed node 202 (e.g., embodied as a child node of multiple parent nodes) may inherit dataset properties of parent nodes 206, 210, 212, and 230 as well as include additional properties that may be unique to seed node 202. In these instances, at least one of the data properties of seed node 202 may be shared with each of parent nodes 206, 210, 212, and 230 and may be discoverable through a search of a plurality of workspaces of the system.

Additional linked nodes may be discoverable as well. For example, each of the identified parent nodes 206, 210, 212, and 230 may correspond with additional parent nodes and/or child nodes, including nodes 208, 218, 214, 216, 232, 234, 236, 238, and 222.

Seed node 202 and the plurality of linked nodes (e.g., directly linked nodes, linked nodes that are linked to linked nodes, etc.) may be identified through a recursive search of the plurality of workspaces of the system. Once identified, the system may initiate an endpoint process for each of the seed data and the linked data associated with the plurality of nodes identified through the search, as illustrated with FIG. 3.

Figure 3:
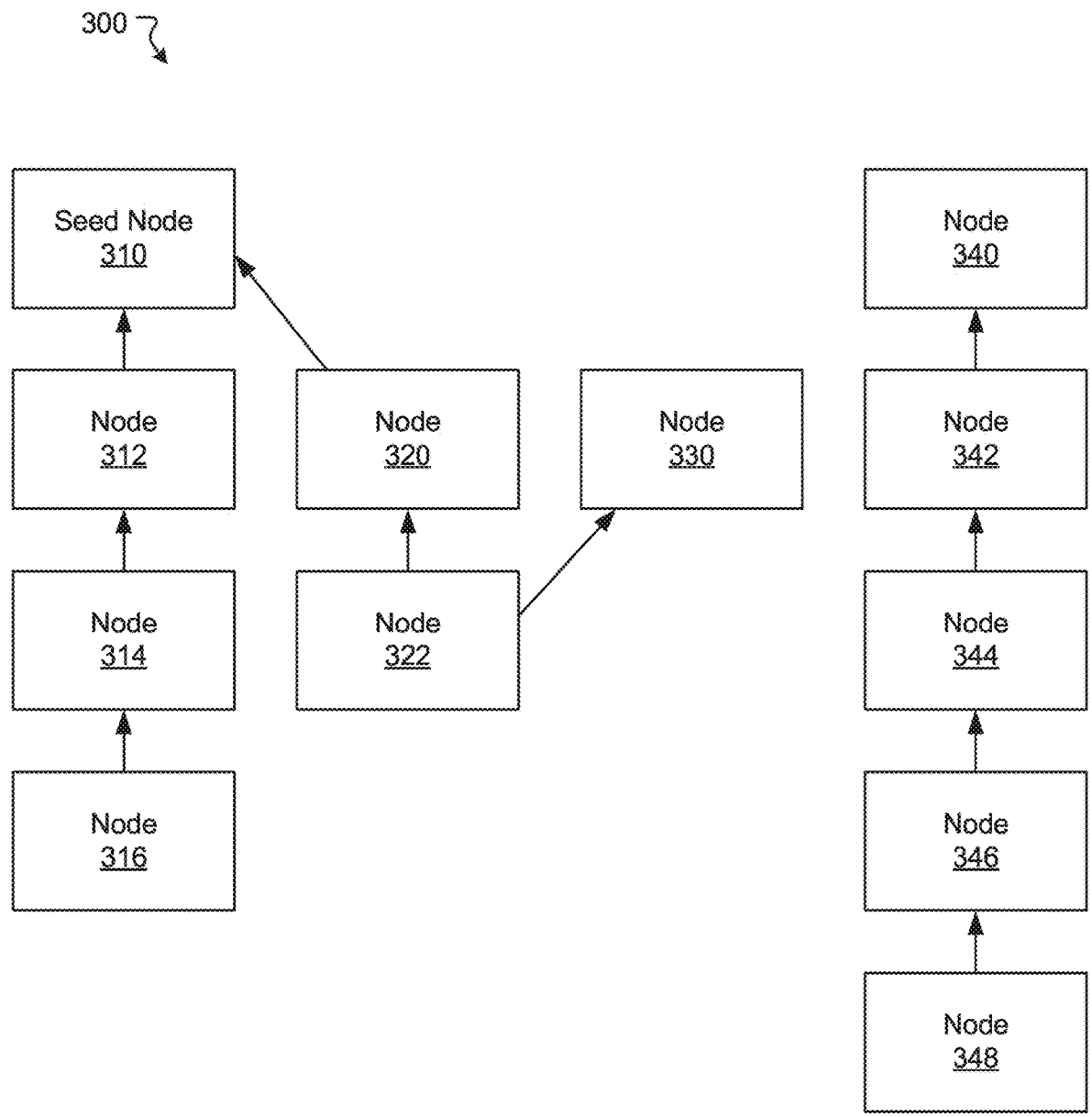
FIG. 3 illustrates an example node resource structure, in accordance with various embodiments.

FIG. 3 illustrates an example node resource structure, in accordance with various embodiments. In illustration 300, a plurality of nodes has been identified through a recursive search of the plurality of workspaces of the system. For example, the seed data matching the search criteria may correspond with seed node 310. The recursive search may identify a plurality of linked nodes from seed node 310, including nodes 312, 314, 316, 320, 322. A plurality of nodes may be available in the system but not identified as linked nodes through the recursive search, including node 330, 340, 342, 344, 346, 348.

An endpoint process may be initiated for the seed data and the linked data corresponding with each of these nodes. For example, the endpoint process may flag the data corresponding with each node for deletion (e.g., in programming code, in one or more datasets, in a data log, etc.) by assigning a unique endpoint to the plurality of nodes corresponding with seed data or linked data. At a later point in time, the system may search for any endpoint identified in the programming code that was assigned through the endpoint process.

In an illustrative example, node 310 may be associated with an endpoint and the recursive search may identify any nodes associated with node 310. The search may also identify nodes 312, 314, 316 as comprising a single parent node associated with node 310. Nodes 312, 314, 316 may be associated with endpoints as well. Node 320 may be associated with an endpoint because node 310 is a parent node of node 320 with no other parent node. Node 322 may not be associated with an endpoint because node 322 is associated with two parent nodes 320, 330 and at least one of these parent nodes (node 330) has not been identified through the recursive search, there is no endpoint associated with node 330. Node 322 may not be associated with an endpoint as well for having at least one parent not associated with an endpoint. As such, nodes 310, 312, 314, 316, 320 may be associated with endpoints during the endpoint process. In this example, nodes 322, 330, 340, 342, 344, 346, 348 may be preserved and not associated with an endpoint during the endpoint process. The traversal of the nodes may be ended when there are no more nodes in the object graph.

Upon completion of the search, data corresponding with each endpoint may be deleted by modifying the connectivity to the data, removing attributes associated with the data, modifying the hierarchy corresponding with parent or child nodes of the data, and the like. For example, data stored in a plurality of datasets in a plurality of workspaces of the system may be removed from the system (e.g., by highlighting at least one data entry in a database and selecting "delete" as an operation by an administrator or automated process of computing system 102, etc.). In some examples, the system may initiate a deletion process that programmatically and/or automatically identifies the datasets corresponding with the data in the workspaces of the system and selects the "delete" operation. In some examples, any pointers that are directed to the data may be removed so that the data is undiscoverable in memory.

In some examples, the deletion process may generate an error log. The error log may identify any data that are not deleted yet are associated with an endpoint during the endpoint process. The error log may document any failure encountered when attempting to delete the seed data or linked data associated with these nodes.

Example Flowchart of Process

Figure 4:
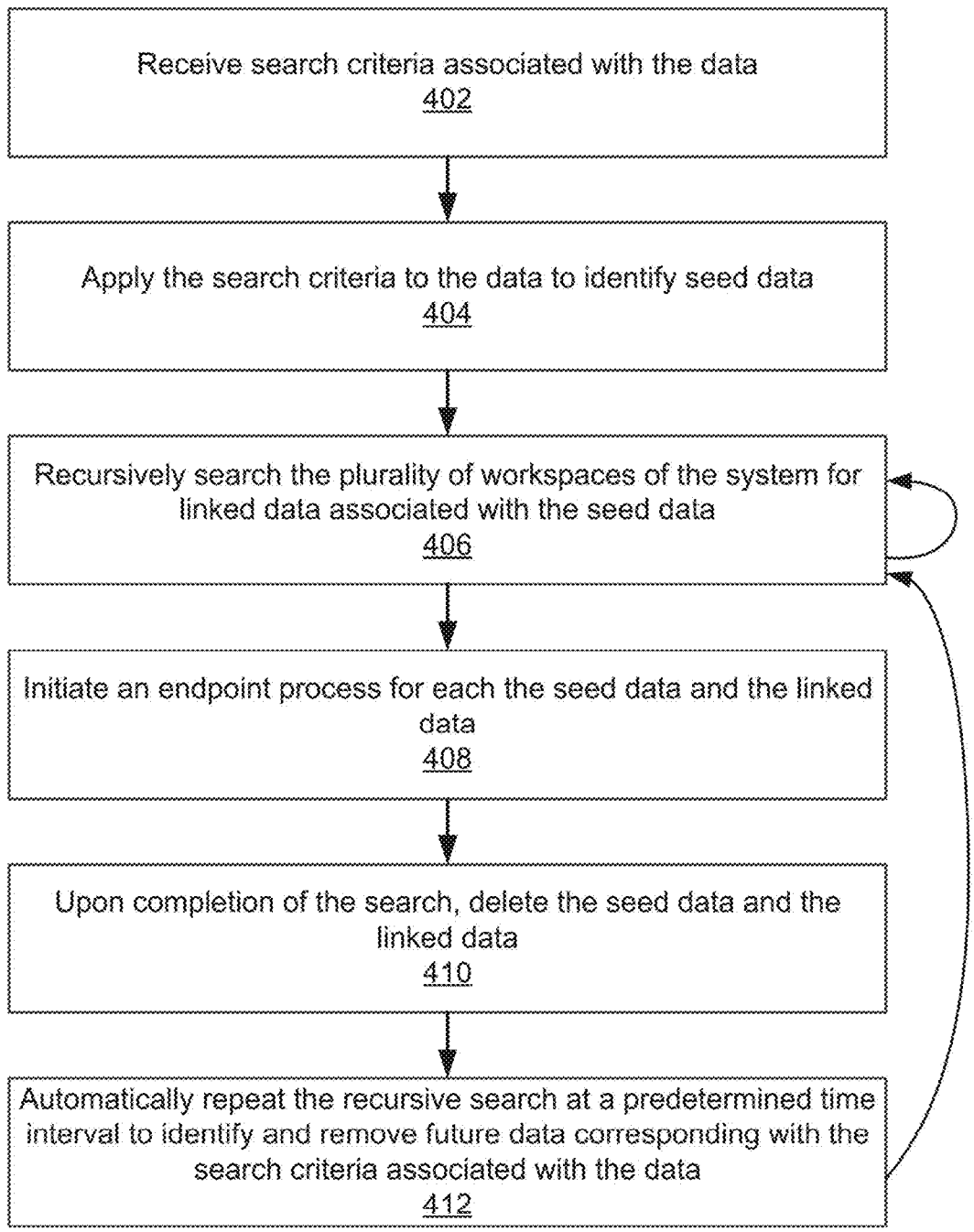
FIG. 4 illustrates a flowchart of an example method, in accordance with various embodiments.

FIG. 4 depicts a flowchart of an example method 400 for inferring relationships, in accordance with various embodiments. The operations of method 400 presented below are intended to be illustrative and, as such, should not be viewed as limiting. In some implementations, method 400 may be accomplished with one or more additional operations not described, and/or without one or more of the operations discussed. In some implementations, two or more of the operations may occur substantially simultaneously. The described operations may be accomplished using some or all of the system components described herein.

In an operation 402, method 400 may include receiving search criteria associated with data. In some examples, the data are stored in a plurality of datasets at a plurality of workspaces of the system. In an operation 404, the method 400 may apply the search criteria to the data to identify seed data. In an operation 406, the method may recursively search the plurality of workspaces of the system for linked data associated with the seed data. Operation 406 may be performed recursively and/or multiple times. In an operation 408, an endpoint process may be initiated for each of the seed data and the linked data. In some examples, the endpoint process may flag the seed data and the linked data for deletion. In an operation 410, upon completion of the search, the seed data and the linked data may be deleted based in part on the endpoint process. In an operation 412, the recursive search may be automatically repeated at a predetermined time interval to identify and remove future data corresponding with the search criteria associated with the data.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as IOS, Android, Chrome OS, Windows XP, Windows Vista, Windows 7, Windows 8, Windows Server, Windows CE, Unix, Linux, SunOS, Solaris, iOS, Blackberry OS, Vx Works, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
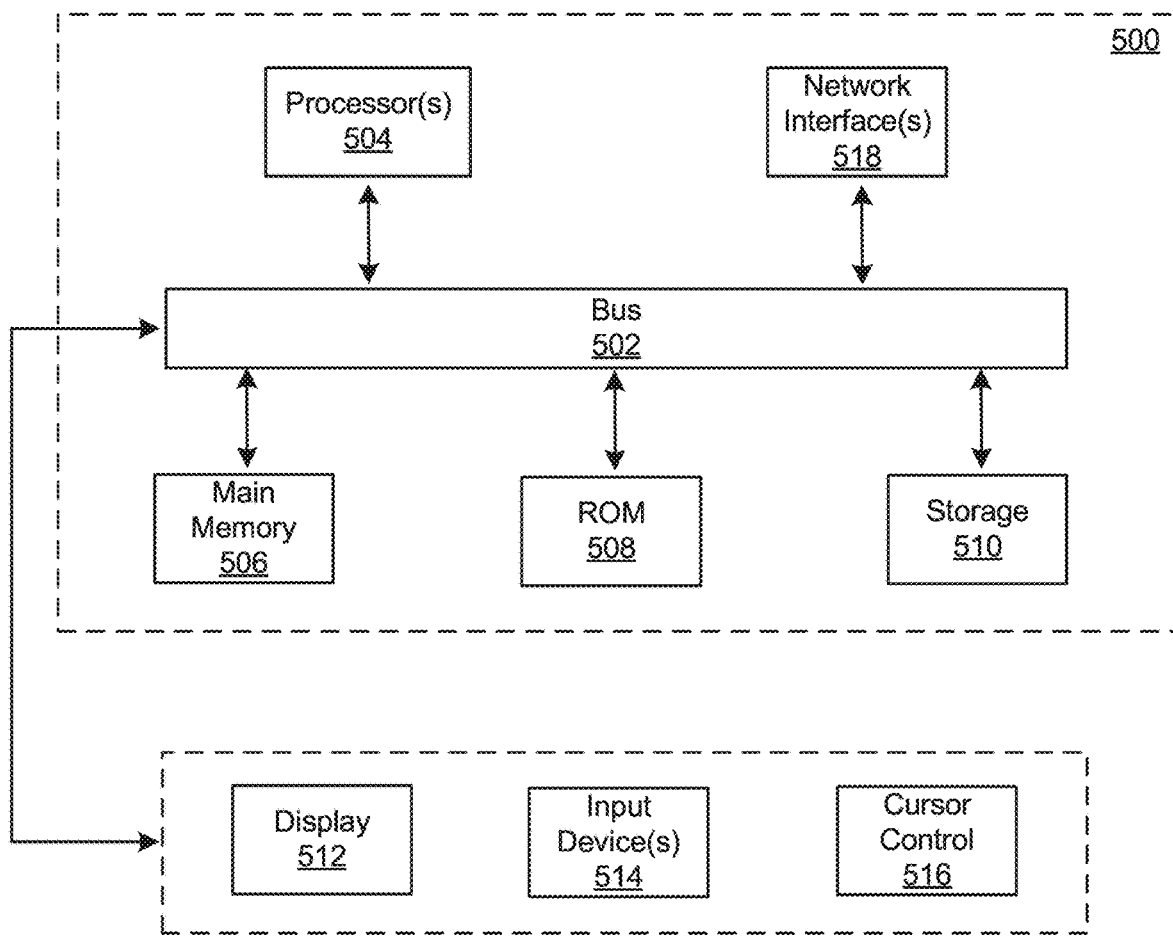
FIG. 5 illustrates a block diagram of an example computer system in which any of the embodiments described herein may be implemented.

FIG. 5 depicts a block diagram of an example computer system 500 in which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media may also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer may load the instructions into its dynamic memory and send the instructions over a telephone line using a modem. A modem local to computer system 500 may receive the data on the telephone line and use an infra-red transmitter to convert the data to an infra-red signal. An infra-red detector may receive the data carried in the infra-red signal and appropriate circuitry may place the data on bus 502. Bus 502 carries the data to main memory 506, from which processor 504 retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 may send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines may provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment may be combined with one or more features of any other embodiment.

Other implementations, uses and advantages of the invention will be apparent to those skilled in the art from consideration of the specification and practice of the invention disclosed herein. The specification should be considered to describe examples only, and the scope of the invention is accordingly intended to be limited only by the following claims.

What is claimed is:

1. A system for storing data, the system comprising:
   one or more processors; and
      a memory storing instructions that, when executed by the one or more processors, cause the system to perform operations further comprising:
      storing or representing data as a plurality of containers or objects;
      identifying a seed container or seed object satisfying a search criteria and flagging the seed container or seed object for deletion;
      recursively searching to identify child containers or child objects linked to the seed container or seed object, wherein the child containers or child objects have a direct or an indirect child relationship to the seed container or seed object, wherein the recursive search proceeds in a direction from a parent container or parent object to a child container or child object;
      flagging one or more identified child containers or child objects or dependent containers or dependent objects for potential deletion based on respective flag statuses of one or more additional parent containers or objects of the identified child containers or child objects or dependent containers or dependent objects; and
      upon completion of the search, selectively deleting the one or more identified child containers or child objects or dependent containers or dependent objects, wherein the selective deletion of the one or more child containers or child objects comprises at least temporarily retaining any of the identified child containers or child objects or dependent containers or dependent objects that have an unflagged parent container or unflagged parent object.

2. The system of claim 1, wherein the unflagged parent container or unflagged parent object indicates a to-be-retained status of the unflagged parent container or the unflagged parent object.

3. The system of claim 1, wherein the instructions that, when executed by the one or more processors, cause the system to perform operations further comprising:
   conducting a subsequent search based on the recursive searching starting from the seed container, the seed object, the deleted child container, or the deleted child object.

4. The system of claim 1, wherein the instructions that, when executed by the one or more processors, cause the system to perform operations further comprising:
   deleting access control or permission data corresponding to the seed data or the seed object.

5. The system of claim 4, wherein the access control or permission data is stored in a separate dataset.

6. The system of claim 1, wherein the instructions that, when executed by the one or more processors, cause the system to perform operations further comprising:
   terminating the recursive search when an object node is identified as anonymized data or comprises an access restriction on data corresponding to the identified object node.

7. The system of claim 1, wherein the recursively searching to identify child containers or child objects linked to the seed container or seed object is based on a criteria, the criteria comprising an edge distance between the seed container or seed object to the identified child containers or child objects.

8. A method implemented by a computing system including one or more processors and storage media storing machine-readable instructions, wherein the method is performed using the one or more processors, the method comprising:
   storing or representing data as a plurality of containers or objects;
   identifying a seed container or seed object satisfying a search criteria and flagging the seed container or seed object for deletion;
   recursively searching to identify child containers or child objects linked to the seed container or seed object, wherein the child containers or child objects have a direct or an indirect child relationship to the seed container or seed object, wherein the recursive search proceeds in a direction from a parent container or parent object to a child container or child object;
   flagging one or more identified child containers or child objects or dependent containers or dependent objects for potential deletion based on respective flag statuses of one or more additional parent containers or objects of the identified child containers or child objects or dependent containers or dependent objects; and
   upon completion of the search, selectively deleting the one or more identified child containers or child objects or dependent containers or dependent objects, wherein the selective deletion of the one or more child containers or child objects comprises at least temporarily retaining any of the identified child containers or child objects or dependent containers or dependent objects that have an unflagged parent container or unflagged parent object.

9. The method of claim 8, wherein the unflagged parent container or unflagged parent object indicates a to-be-retained status of the unflagged parent container or the unflagged parent object.

10. The method of claim 8, further comprising:
conducting a subsequent search based on the recursive searching starting from the seed container, the seed object, the deleted child container, or the deleted child object.

11. The method of claim 8, further comprising:
deleting access control or permission data corresponding to the seed data or the seed object.

12. The method of claim 11, wherein the access control or permission data is stored in a separate dataset.

13. The method of claim 8, further comprising terminating the recursive search when an object node is identified as anonymized data or comprises an access restriction on data corresponding to the identified object node.

14. The method of claim 8, wherein the recursively searching to identify child containers or child objects linked to the seed container or seed object is based on a criteria, the criteria comprising an edge distance between the seed container or seed object to the identified child containers or child objects.

15. A non-transitory computer readable medium comprising instructions that, when executed, cause one or more processors of a computing system to perform:
storing or representing data as a plurality of containers or objects;
identifying a seed container or seed object satisfying a search criteria and flagging the seed container or seed object for deletion;
recursively searching to identify child containers or child objects linked to the seed container or seed object, wherein the child containers or child objects have a direct or an indirect child relationship to the seed container or seed object, wherein the recursive search proceeds in a direction from a parent container or parent object to a child container or child object;
flagging one or more identified child containers or child objects or dependent containers or dependent objects for potential deletion based on respective flag statuses of one or more additional parent containers or objects of the identified child containers or child objects or dependent containers or dependent objects; and
upon completion of the search, selectively deleting the one or more identified child containers or child objects or dependent containers or dependent objects, wherein the selective deletion of the one or more child containers or child objects comprises at least temporarily retaining any of the identified child containers or child objects or dependent containers or dependent objects that have an unflagged parent container or unflagged parent object.

16. The non-transitory computer readable medium of claim 15, wherein the unflagged parent container or unflagged parent object indicates a to-be-retained status of the unflagged parent container or the unflagged parent object.

17. The non-transitory computer readable medium of claim 15, wherein the instructions that, when executed, cause one or more processors of the computing system to perform:
conducting a subsequent search based on the recursive searching starting from the seed container, the seed object, the deleted child container, or the deleted child object.

18. The non-transitory computer readable medium of claim 15, wherein the instructions that, when executed, cause one or more processors of the computing system to perform:
deleting access control or permission data corresponding to the seed data or the seed object.

19. The non-transitory computer readable medium of claim 18, wherein the access control or permission data is stored in a separate dataset.

20. The non-transitory computer readable medium of claim 15, wherein the instructions that, when executed, cause one or more processors of the computing system to perform:
terminating the recursive search when an object node is identified as anonymized data or comprises an access restriction on data corresponding to the identified object node.

\* \* \* \* \*